Feb. 22, 1966  S. W. THOMPSON  3,236,927
METHOD OF MOLDING FOAMABLE PLASTIC MATERIALS
Original Filed Sept. 25, 1962
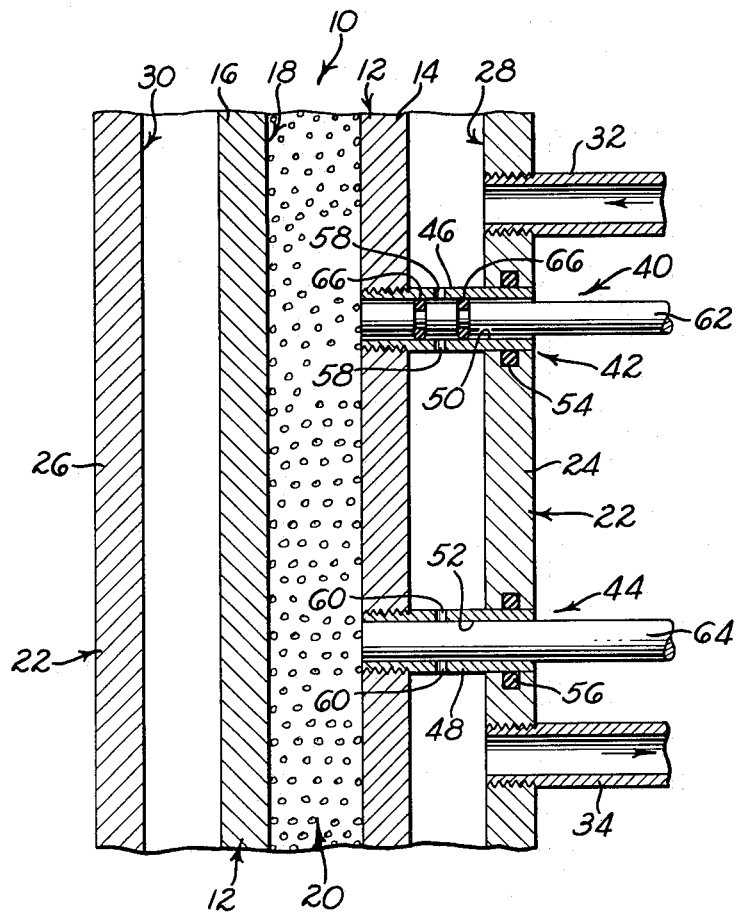
INVENTOR.
STANLEY W. THOMPSON
BY HIS ATTORNEYS.
HARRIS, KIECH, RUSSELL & KERN

United States Patent Office 3,236,927
Patented Feb. 22, 1966

3,236,927
METHOD OF MOLDING FOAMABLE PLASTIC MATERIALS
Stanley W. Thompson, Scottsdale, Ariz., assignor, by mesne assignments, to Thompson Industries Co., Inc., Los Angeles, Calif., a corporation of Delaware
Original application Sept. 25, 1962, Ser. No. 226,138, now Patent No. 3,193,876, dated July 13, 1965. Divided and this application Aug. 18, 1964, Ser. No. 390,327
6 Claims. (Cl. 264—51)

This application is a division of my copending application Serial No. 226,138, filed September 25, 1962, and now Patent No. 3,193,876.

The present invention relates to, and the basic object thereof is to provide, a method of molding foamable plastic materials in a manner to minimize molding time.

Foamable plastic materials are ordinarily thermoplastic in nature and are normally provided in the form of granules or pellets containing a foaming agent responsive to heat. The foaming agent may merely comprise gaseous inclusions in the pellets or granules, although other foaming agents may be utilized also. When such a foamable plastic material is confined in a mold cavity and the mold is heated, the granules or pellets expand, due to the action of the foaming agent incorporated therein, and fuse together in an integral mass conforming to the mold cavity. The necessary heat is normally applied by heating the mold wall or walls defining the mold cavity, which tends to fuse the foamable plastic material into an impervious, glazed surface wherever it contacts a wall of the mold cavity. The interior of the molded article, however, has a cellular structure providing excellent heat insulating qualities, cushioning qualities, buoyancy, and the like. For example, articles molded of foamable plastic materials in this manner provide excellent heat insulating drinking cups.

It will be understood that the foregoing molding procedure may be applied to any desired article and that the invention is not to be regarded as limited to any particular article. Examples of articles which may be molded of foamable plastic materials in this fashion include, in addition to drinking cups, such things as picnic boxes, portable refrigerating chests, flotation devices, cushioning materials for use in packaging, and the like. For this reason, the invention will be considered herein in connection with a general mold configuration only, and is not to be regarded as limited to any particular mold configuration. For an example of a complete molding machine with which the present invention might be utilized, attention is directed to Patent No. 2,951,260, granted September 6, 1960, to James M. Harrison and Robert F. Smucker, the disclosure of this patent being incorporated herein by reference.

As disclosed in the aforementioned patent, the wall or walls of the mold cavity may be heated by the external application of steam thereto in order to heat the foamable plastic material within the mold cavity sufficiently to provide the resulting article with a fused cellular interior and a glazed surface wherever it contacts a wall of the mold cavity. Heating in this fashion is undesirably slow and, to increase production rates, it is desirable to further heat the foamable plastic material within the mold cavity by the direct application of steam thereto. However, if this is done prior to thoroughly preheating the mold and the foamable plastic material, excessive quantities of steam may condense within the mold cavity. The presence of excessive amounts of water has an adverse effect on the molding operation. For example, the water tends to prevent fusion between the pellets or granules, and may result in voids which permit leakage. Also, excessive water in the mold cavity may result in pockmarked surfaces. Another disadvantage is that water present in liquid form inhibits uniform heat transfer throughout the mass of foamable plastic material in the mold cavity. Another drawback is that the surface tension of water in liquid form adhering to the plastic pellets or granules may inhibit uniform distribution of the pellets or granules throughout the mold cavity.

For the foregoing and other reasons, it is essential that the mold be thoroughly preheated prior to the introduction of any steam into the mold cavity into direct contact with the foamable plastic material therein. If thorough preheating occurs prior to the introduction of steam, then condensation within the mold cavity is held to an insignificant minimum.

With the foregoing as background, a primary object of the invention is to provide a very simple method of introducing steam into the mold cavity only after the mold has been thoroughly preheated.

Another important object is to provide a molding method which permits preheating the mold and filling the mold cavity with the granular foamable material simultaneously, thereby reducing significantly the total time required for the molding operation.

Still another object of the invention is to provide a method of introducing steam into the mold cavity after thorough preheating which requires the addition of only a minimum of structure to an ordinary steam heated mold.

The invention contemplates a mold construction which includes spaced valves for admitting steam from a steam chamber adjacent the mold cavity into the mold cavity itself, this being done, in accordance with the invention, only after the mold has been thoroughly preheated and has been filled with the foamable plastic pellets or granules. With this procedure, the mold cavity is isolated from the steam chamber initially, the desired introduction of steam into the mold cavity being achieved very simply by opening the valves mentioned to establish communication between the steam chamber and the mold cavity after thorough preheating of the mold and the foamable plastic granules. This procedure requires no elaborate system of multiple chambers around the mold cavity, which is an important feature.

The foregoing objects, advantages, features and results of the present invention, together with various other objects, adavntages, features and results thereof which will be evident to those skilled in the molding art in the light of this disclosure, may be achieved with the exemplary embodiment of the invention described in detail hereinafter with reference to the accompanying drawing.

The single figure of the drawing is a fragmentary sectional view showing part of a mold 10 which may be used to practice the method of the invention. The mold 10 may have any desired configuration, depending on the configuration desired for the article to be molded from a foamable plastic material. For example, the mold 10 may have the configuration disclosed in the aforementioned patent, although this is by no means essential.

The mold 10 includes wall means 12, shown as including walls 14 and 16, which cooperate to provide a mold cavity 18 into which pellets or granules of a foamable plastic material 20 may be introduced in any suitable manner. It will be understood that the mold cavity 18 is shown semidiagrammatically solely for purposes of illustration and that it may have any desired over-all configuration, depending upon the article to be molded.

Spaced from the wall means 12 forming the mold cavity 18 is a wall means 22, shown as including walls 24 and 26, which cooperates with the wall means 12 to form steam chambers 28 and 30. These chambers may be integrally interconnected so as to constitute, in effect, a single chamber, or they may be separate chambers as shown. Steam is introduced into the steam chamber 28 through an inlet 32, such chamber being provided with an outlet 34. In the event that the chambers 28 and 30 are interconnected, the inlet 32 and the outlet 34 serve both. Otherwise, the chamber 30 may be provided with a similar inlet and outlet, not shown.

The mold structure thus far described may, for example, be regarded as corresponding to a fragment of the mold structure of the aforementioned patent for forming a fragment of a drinking cup side wall. However, as hereinbefore indicated, the exact mold configuration is not material.

The mold 10 is provided with valve means 40 for admitting steam from the steam chamber 28 (and/or the steam chamber 30) into the mold cavity 18 after the structure of the mold 10, and the foamable plastic material 20 in the mold cavity 18, have been preheated, in accordance with the invention, to an extent sufficient to prevent significant condensation within the mold cavity. Since no steam is admitted into the mold cavity 18 until adequate preheating has occurred as the result of application of steam to the exterior of the mold cavity, there is no necessity for delaying the introduction of the foamable plastic material 20 until after preheating has taken place. In other words, in accordance with the invention, the introduction of the foamable plastic material 20 and the preheating of the mold 10 are carried on simultaneously to reduce the over-all molding time, which is an important feature.

The valve means 40 includes a plurality of spaced valves located sufficiently close together to insure uniform steam distribution throughout, and consequent uniform heating of, the mass of foamable plastic material 20 within the mold cavity 18. For purposes of illustration, only two such valves are shown, these being identified by the reference numerals 42 and 44.

The valves 42 and 44 respectively include cylinders 46 and 48 bridging the space between the walls 14 and 24 and providing through bores 50 and 52. In the particular construction illustrated, the cylinders 46 and 48 are threaded through the wall 14 and extend through the wall 24, being sealed with respect to the latter by O-rings 54 and 56.

The cylinders 46 and 48 communicate with the mold cavity 18 at their inner ends and are provided with ports 58 and 60 in communication with the steam chamber 28. The ports 58 and 60 are normally closed by valve members 62 and 64, respectively. The ports 58 are closed by the valve member 62 when the latter is in a position such that the ports 58 are between O-rings 66 on this valve member. In the case of the valve 44, the valve member 64 makes a fluid-tight sliding fit in the bore 52 so that communication between the steam chamber 28 and the mold cavity 18 is prevented when the valve member 64 is in a position to cover the ports 60. The desired communication is established with the valve 42 by moving the valve member 62 to the right, as viewed in the drawing, sufficiently to move both O-rings 66 to the right side of the ports 58. Similarly, communication between the steam chamber 28 and the mold cavity 18 is established with the valve 44 by moving the valve member 64 to the right, as viewed in the drawing, sufficiently to uncover the ports 60.

When the mold 10 is opened in a manner not shown, the valve members 62 and 64 may be moved to the left, as viewed in the drawing, to project them into the mold cavity 18 so as to strip the molded article from the cavity wall 14.

It will be understood that the valves 42 and 44 are illustrative only and that the same results may be achieved with other valve structures.

*Operation*

Considering the method of the invention, while the mold 10 is being preheated, the mold cavity 18 is simultaneously filled with the foamable plastic material 20, as hereinbefore outlined, it being unnecessary to delay the introduction of the material to be molded until after preheating, thereby reducing the over-all molding time.

After the mold 10 and the foamable plastic material 20 in the mold cavity 18 have been preheated sufficiently to preclude significant condensation within the mold cavity upon the introduction of steam thereinto, the valves 62 and 64 are opened, in any suitable manner, to establish communication between the steam chamber 28 and the mold cavity. The valves 62 and 64 remain in their open positions, while the introduction of steam is continued, until sufficient steam has been admitted to the mold cavity 18 to achieve the desired further heating of the foamable plastic material 20. Thereupon, the valves 62 and 64 are closed and, when the molding operation has been completed, the introduction of steam is terminated. In some instances, it may be desirable to close the valves 62 and 64 and to terminate the introduction of steam into the steam chambers 28 and 30 simultaneously. In other instances, it may be desirable to continue the introduction of steam after interrupting the admission of steam into the mold cavity 18. In either event, because of the preheating prior to admitting steam into the mold cavity 18, condensation within the mold cavity is held to an insignificant minimum.

Subsequently, a suitable coolant, such as cold water, may be circulated through the steam chambers 28 and/or 30, as by way of the inlet 32 and the outlet 34. After the mold 10 and the molded article in the cavity 18 have been cooled sufficiently to set the molded article enough to render it self supporting, the mold may be opened and the molded article removed. If necessary, the valves 62 and 64 may be utilized to strip the molded article from the cavity wall 14. It will be understood that the molded article may be stripped from the cavity wall 16 in the same way if desired by providing similar valves on the opposite side of the cavity (in which event steam can be admitted into the mold cavity from both sides thereof during the fusing operation).

An additional advantage of the present invention is that since the valves 62 and 64 are in their closed positions during the cooling portion of the cycle, none of the coolant comes into contact with the molded article. This avoids producing any imperfections therein which might result from direct contact of the coolant with the molded article.

Thus, the present invention provides, with a relatively simple structure, a method of accelerating the molding operation materially while still insuring a perfectly molded product.

I claim as my invention:

1. A method of molding a foamable plastic material, characterized by the use of a mold having wall means defining a mold cavity, and including the steps of:
   (a) introducing the foamable plastic material into said mold cavity;
   (b) applying steam externally to said wall means while excluding such steam from said mold cavity to preheat said wall means and the foamable plastic material within said mold cavity; and
   (c) subsequent to the steps of subparagraphs (a) and (b) admitting steam, which has previously been in contact with the outer side of said wall means, into said mold cavity to further heat the foamable plastic material.

2. A method of molding a foamable plastic material, characterized by the use of a mold having wall means defining a mold cavity, and including the steps of:
   (a) introducing the foamable plastic material into said mold cavity;
   (b) simultaneously with the step of subparagraph (a) applying steam externally to said wall means while excluding such steam from the mold cavity to preheat said wall means and the foamable plastic material within said mold cavity;
   (c) continuing to apply steam externally to said wall means to further heat said wall means and the foamable plastic material within said mold cavity; and
(d) subsequent to the steps of subparagraphs (a) and (b) admitting part of the steam previously used to heat said wall means into said mold cavity to still further heat the foamable plastic material.

3. A method of molding a foamable plastic material, characterized by the use of a mold having wall means defining a mold cavity, and including the steps of:
(a) introducing the foamable plastic material into said mold cavity;
(b) simultaneously with the step of subparagraph (a) applying steam externally to said wall means while excluding such steam from said mold cavity to preheat said wall means and the foamable plastic material within said mold cavity;
(c) continuing to apply steam externally to said wall means to further heat said wall means and the foamable plastic material within said mold cavity;
(d) subsequent to the steps of subparagraphs (a) and (b) admitting part of the steam previously used to heat said wall means into said mold cavity to further heat the foamable plastic material;
(e) thereafter terminating the application of steam externally to said wall means and the admission of steam into said mold cavity; and, finally,
(f) applying a coolant to the outer side of said wall means while excluding said coolant from said mold cavity.

4. A method according to claim 1, wherein:
(a) the introduction of the foamable plastic material into the mold cavity and the application of steam to said wall means are performed simultaneously.

5. A method according to claim 1, including:
(a) admitting said steam into the mold cavity by bypassing the steam through openings in the wall means.

6. A method according to claim 1 wherein one side of said wall means defines a mold cavity and the other side defines a steam chamber, including:
(a) admitting said steam, which has previously been in said steam chamber, directly into the mold cavity through ports in said wall means.

References Cited by the Examiner
UNITED STATES PATENTS

| | | | |
|---|---|---|---|
| 357,639 | 2/1887 | Snow | 18—6 |
| 2,250,697 | 7/1941 | Bassett | 254—51 |
| 2,954,589 | 10/1960 | Brown | 264—51 XR |
| 3,013,306 | 12/1961 | Richie et al. | 264—51 |
| 3,139,466 | 6/1964 | Couchman | 264—51 |
| 3,156,015 | 11/1964 | Harrison | 264—51 XR |
| 3,170,010 | 2/1965 | Schultz et al. | 264—51 |

OTHER REFERENCES

Koppers Company, "Technical manual Dylite expandable polystyrene, mold techniques and mold design," Bulletin C-9-273, chapter 3e, November 15, 1959, pages 12–20.

ALEXANDER H. BRODMERKEL, *Primary Examiner.*

P. E. ANDERSON, *Assistant Examiner.*